(12) United States Patent
Chen et al.

(10) Patent No.: US 8,703,842 B1
(45) Date of Patent: Apr. 22, 2014

(54) LOW-CTE, LIGHTWEIGHT HYBRID MATERIALS WITH HIGH DURABILITY IN OUTSPACE

(75) Inventors: Ming-Yung Chen, Beavercreek, OH (US); Chenggang Chen, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 122 days.

(21) Appl. No.: 13/192,966

(22) Filed: Jul. 28, 2011

Related U.S. Application Data

(60) Provisional application No. 61/368,764, filed on Jul. 29, 2010.

(51) Int. Cl.
C08J 9/32 (2006.01)

(52) U.S. Cl.
USPC ........... 523/219; 532/219; 524/406; 524/445; 524/450; 524/492

(58) Field of Classification Search
USPC ........... 523/218, 219; 524/406, 445, 450, 492
See application file for complete search history.

(56) References Cited

U.S. PATENT DOCUMENTS 6,420,476 B1 * 7/2002 Yamada et al. ............... 524/575

OTHER PUBLICATIONS

L.E. Matson et al., "Advanced Materials and Processes for Large, Lightweight, Space-Based Mirrors", http://amptiac.alionscience.com/quarterly, pp. 1681-1697, vol. 4,. Defense Technical Information Center.
H. Fong et al., "Self-Passivation of Polymer-Layered Silicate Nanocomposites", Chem. Mater. 2001, pp. 4123-4129, vol. 13.
C.P. Wong et al., "Thermal Conductivity, Elastic Modulus, and Coefficient of Thermal Expansion of Polymer Composites Filled with Ceramic Particles for Electronic Packaging", Journal of Applied Polymer Science, 1999, pp. 3396-3403, vol. 74,. John Wiley & Sons, Inc.
L.M. Sullivan T al., "Zirconium Tungstate ($ZrW_2O_8$)/Polyimide Nanocomposites Exhibiting Reduced Coefficient of Thermal Expansion", Chem. Mater., 2005, pp. 2136-2141, vol. 17.
J. Lee et al., "Fracture of Glass Bead/Epoxy Composites: on Micro-Mechanical Deformations", Polymer, 2000, pp. 8363-8373, vol. 41, Elsevier.

* cited by examiner

*Primary Examiner* — Edward Cain
(74) *Attorney, Agent, or Firm* — AFMCLO/JAZ; Fredric Sinder

(57) ABSTRACT

Light-weight hybrid materials with significantly-reduced coefficient of thermal expansion, low density, and high durability in the aggressive environment such as low-earth orbit are disclosed. The high performance polymer materials can include epoxy, cyanoester, bismalmeide, polyimide, vinylester, polyamide, polyacrylate, and others; with their applications as matrix in the carbon fiber-reinforced or glass fiber-reinforced composite. The fillers for the hybrid include one or two or all, of the following components: the layered-silicate, negative-CTE powder, and low-density material.

16 Claims, 4 Drawing Sheets

LOW-CTE, LIGHTWEIGHT HYBRID MATERIALS WITH HIGH DURABILITY IN OUTSPACE

CROSS REFERENCE TO RELATED APPLICATION

This application claims priority of the filing date of provisional application Ser. No. 61/368,764 filed Jul. 29, 2010.

RIGHTS OF THE GOVERNMENT

The invention described herein may be manufactured and used by or for the Government of the United States for all governmental purposes without the payment of any royalty.

BACKGROUND INFORMATION

The present invention relates to multifunctional hybrid materials and a method for making the materials, which enhance the survivability in an aggressive environment such as low-earth orbit and have low coefficients of thermal expansion and low density.

The development of the new multifunctional materials for the aerospace application is an urgent demand. There are several important requirements for the materials for the aerospace application. The first issue is the rapid change of temperature in aerospace environment. The mismatch of the coefficients of thermal expansion between the polymer (typically 40-60 ppm/K) and carbon fiber (~0 ppm/K) in the traditional composite can be the reason for the fracture and degradation of the composite materials. In addition, the mismatch of the coefficients of thermal expansion between the titanium (~10 ppm/K) and polymer adhesive is also significant, so it is important to reduce the coefficient of thermal expansion of the polymer. Here the reduction of the coefficient of thermal expansion was achieved by the introduction of the negative-CTE filler such as Zirconium Tungstate ($ZrW_2O_8$). $ZrW_2O_8$ is a ceramic with a p.p.m.$K^{-1}$) over a very wide temperature range (from 0.3° K to 1050° K), and the isotropic negative CTE.

The second very important issue for the materials out in space application is the weight of the materials. The low density of the material is critical. The introduction of the microballoon into the system will significantly reduce the density of the polymer and reduce the coefficient of thermal expansion simultaneously. The third important issue is that the polymers will easily erode in an aerospace environment such as low earth orbit, where atomic oxygen flux is very high. The introduction of the silicate nanolayers significantly improves the survivability of the materials in an aerospace environment. The improved survivability of the materials after the incorporation of the silicate nanolayers is due to the formation ceramic-like inorganic layers, which can prevent further erosion of the polymeric materials.

Polymer membrane mirrors offer the greatest potential for large aperture extremely lightweight mirror systems. For example, they could be deployable, thus decreasing payload size. They would be able to be made very large (10 s of meters in diameter) but still be extremely low mass. Simultaneously, they are accompanied by many polymer related disadvantages (low environmental stability and large CTE). The system in this invention can also be used in the fabrication of lightweight mirror assemblages since this system is a lightweight structural substrate made from syntactic foams and has a lower out gassing rate in space environments, CTE tailorability, and density reduction.

The objective of this invention is to provide a new hybrid material, which can have low density, low coefficients of thermal expansion and very high survivability in space.

Other objectives and advantages of the invention will be set forth in the description which follows, and in part will be obvious from the description or may be learned by the practice of the invention. The objects and advantages of the invention may be realized by means of the combinations particularly described in the appended claims.

SUMMARY OF THE INVENTION

In accordance with the present invention there is provided light-weight hybrid materials with significantly-reduced coefficient of thermal expansion, low density, and high durability in an aggressive environment such as low-earth orbit. The hybrid materials comprise mixture of a polymer, negative coefficient of thermal expansion (CTE) powder, a low density filler; and a layered-silicate.

A method for preparing the light-weight hybrid materials is also provided. The method comprising the steps of first mixing the polymer with nano layered silicates to make a nanocomposite mixture. The nanocomposite mixture is then mixed with low density fillers (e.g., glass microballoons) and/or negative CTE powders (e.g., zirconium tungstate particles) to form the hybrid materials.

DETAILED DESCRIPTION OF THE INVENTION

Figure 1:
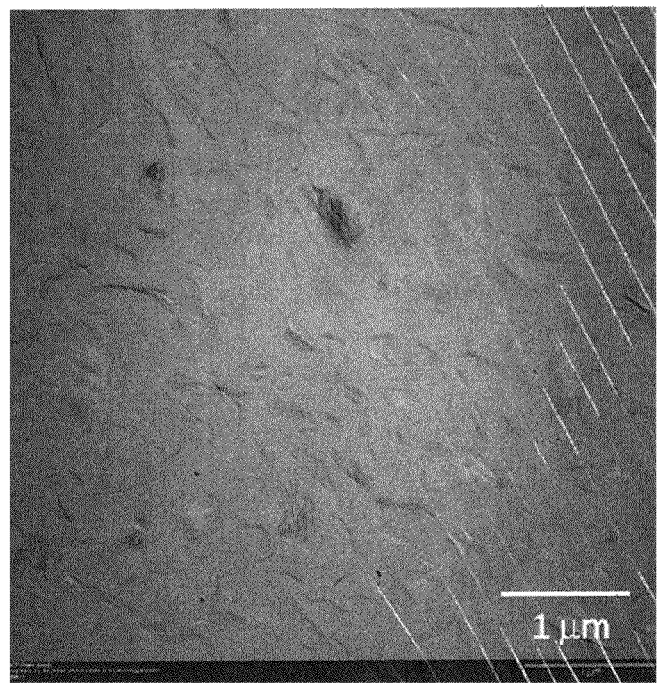
FIG. 1 is a TEM image of a 3% wt. of SC8/Epon 862/W nanocomposite.

The high performance polymer materials can include epoxy, cyanoester, bismalmeide, polyimide, vinylester, polyamide, polyacetal, polycarbonate, polyethylene terephthalate, polysulfone, polyacrylate, and others; with their applications as matrix in the carbon fiber-reinforced or glass fiber-reinforced composite. All these polymers may be employed in the practice of this invention. The fillers for the hybrid include one or two or all, of the following components: the layered-silicate, negative-CTE powder, and low-density materials.

These polymers are mixed with about 0.1 to about 20 weight percent, preferably from about 3 to about 8 weight percent, layered silicate using standard procedures. The term layered silicate can include single sheet layered-silicate such as apophyllite, silinaite, kanemite, etc.; and multi-sheet layered-silicate such as montmorillonite, magadiite, kenyaite, hectorite, etc. Some of these layered-silicates are commercially available, while others can be synthesized by the standard procedure in the laboratory. Montomorillonite is available from Nanocor, Inc. in Arlington Heights, Ill., and Southern Clay Products, Gonzales, Tex. Apophyllite is available from Gelest, Inc. located in Pennsylvania. The original layered-silicates are aggregated nanosilicate in the dimension of micrometer size. The nano silicate are nano-sized (1 nm to several nm thickness while the length and width is micrometer sized) after it is mixed with polymer and the nancomposite is formed.

The negative coefficient of thermal expansion (CTE) powder can be consisting of Zirconium Tungstate ($ZrW_2O_8$), quartz, zeolite and mixtures thereof. Preferably, the negative CTE powder is Zirconium Tungstate, with about 1-60 weight percent loading of said Zirconium Tungstate powder. The zirconium tungstate powder is preferably 3-5 μm in length by 0.3-0.5 μm in width by 0.1-0.3 μm in thickness.

Examples of suitable low density materials include Microballoons which are commercially available from 3M Company located in Minnesota. Microballoons are microscopic, hollow spheres of glass which can be used as low density filler in a variety of composite materials. The hollow glass microspheres, referred to as microballoons in the present invention, have diameters ranging from 5 to 300 μm, more preferably from about 10 to 100 μm.

Preferably, the hybrid materials containing more than two compositions include both the microballoon (low density filler), and Zirconium Tungstate (negative CTE powder). The powder of $ZrW_2O_8$ and nanolaminate mirror film can be made through standard procedure.

Materials

Sodium montmorillonite (SNA) was obtained from Southern Clay Products with a relatively low cation exchange capacity (CEC: 92 meq. Epon 862 (diglycidyl ether of bisphenol F epoxy, DGEBF) and curing agent W (diethyltoluenediamine) were purchased from Miller-Stephenson Chemical Company. N-octylamine was obtained from Aldrich Chemical Company. Microballoon is the glass bubbles (Scotchlite™ brand, D32/4500 Product No. 8-1007-1300-05) from 3M Company. Hydrochloric acid was obtained from Fisher Scientific. The powder of $ZrW_2O_8$ and nanolaminate mirror film was provided by the colleague at AFRL/RXM. $ZrW_2O_8$ is also commercially available from Wah Chang Company in Albany, Oreg.

Synthesis

The synthetic organoclay, SC8 ($C_8H_{17}NH_3^+$-montmorillonite), was prepared through the ion-exchanged chemistry of sodium montmorillonite with ammonium surfactant (n-octylamine and HCl). The details of the preparation of n-$C_8H_{17}NH_3^+$-montmorillonite (SC8) were as follows: SNA (40.0 g) was added to the mixed aqueous and ethanol solution of n-octylamine (8.5 g) and aqueous hydrochloric acid (1N, 65 mL). The mixture suspension was stirred at ~65° C. for six hours. The suspension was filtered and the solid was washed with an ethanol and water mixture several times. The residue was then dried in a vacuum oven.

Formulation

Hybrid Materials 3 wt. % SC8/Epoxy (Epon 862/W) and 6 wt. % SC8/Epoxy (Epon 862/W) hybrids was made as follows: The mixture of SC8, corresponding amount of Epon 862 and acetone were homogenized by simultaneously ultrasonicating (Ultrasonic Processor GEX 750W, 20 KHz, 80% duty cycle) and mixing with a magnetic stir bar (3 h). After that, the acetone in the mixture was evaporated in the vacuum oven and the mixture was degassed. The mixture was mixed with a stoichiometric amount of curing agent W (the weight ratio of Epon 862 to W is 100:26.3). Different formulations of the hybrid materials were made as follows with these SC8/Epon 862/W mixtures:

Example 1

5% SC8/20% Microballoon/Epoxy (Epon 862/W) Hybrid.
The 6% wt. SC8/Epon 862/W mixture was mixed with glass microballoon (wt., glass bead: SC8/Epon 862/W mixture, 1:4). The mixture appeared homogeneous. The mixture was cast in a mold and left at room temperature for two days, and then cured in the oven using the following cure cycle: ramped from room temperature to 250° F. in 30 minutes, cured at 250° F. for two hours, ramped from 250° F. to 350° F. in 30 minutes, postcured at 350° F. for another two hours, and cooled to room temperature in one hour.

Example 2

5% SC8/20% Microballoon/Epoxy Mirror Hybrid.
Different ratios of the epoxy resin beads were formulated in order to try to obtain good adhesion of the mixture with the mirror film. The 6% wt. SC8/Epon 862/W mixture was mixed with glass microballoon (wt., glass bead: SC8/Epon 862/W mixture, 1:4, found to be good adhesive). Then the nanolaminated mirror film was attached with the mold filled with SC8/Epon 862/W/glass microballoon mixture. The hybrid was left at room temperature for two days and then cured at 250° F. (2 hours) and postcured at 350° F. (2 hours).

Example 3

2.5 wt. % SC8/18 wt. % ZrW2O8/Epoxy Hybrid.
The corresponding amount of $ZrW_2O_8$ was mixed with a 3 wt. % SC8/Epon 862/W mixture. The mixture appeared good. The mixture was cast in a mold and left at room temperature for two days, and then cured in the oven at 250° F. (2 hours) and postcured at 350° F. (2 hours).

Example 4

2 wt. % SC8/14.5 wt. % ZrW2O8/20 wt. % Microballoon/Epoxy Hybrid.
The corresponding amount of $ZrW_2O_8$ was mixed with a 3 wt. % SC8/Epon 862/W to make the 2.5 wt. % SC8/18 wt. % $ZrW_2O_8$/Epon 862/W mixture. Then the glass microballoon was added in the above mixture with the weight ratio of the 2.5 wt. % SC8/18 wt. % $ZrW_2O_8$/Epon 862/W resin mixture to the glass bead being 4:1. The mixture was cast in a mold and left at room temperature for two days, and then cured in the oven at 250° F. (2 hours) and postcured at 350° F. (2 hours).

Example 5

2 wt. % SC8/14.5 wt. % ZrW2O8/20 wt. % Microballoon Epoxy Mirror Hybrid.
The corresponding amount of $ZrW_2O_8$ was mixed with a 3 wt. % SC8/Epon 862/W to make the 2 wt. % SC8/14.5 wt. % $ZrW_2O_8$/Epon 862/W mixture. Then the glass microballoon was added in the above mixture with the weight ratio of the resin mixture (2 wt. % SC8/14.5 wt. % $ZrW_2O_8$/Epon 862/W) to the glass bead being 4:1. The nanolaminated mirror film was attached with the mold filled with the 2 wt. % SC8/14.5 wt. % ZrW2O8/20 wt. % Microballoon/Epoxy mixture. The hybrid was left at room temperature for two days, and then cured in the oven at 250° F. (2 hours) and postcured at 350° F. (2 hours).

Characterization and Evaluation

The new SC8 (organoclay) synthesized in the laboratory was checked using x-ray diffraction. The x-ray diffraction shows that the interplanar spacing between the nanolayers was increased from 11.2 Å to 13.6 Å after the larger octylammonium ion was exchanged with the sodium ion. The ion-exchange chemistry was very successful.

The SC8 was mixed with acetone and Epon 862 under ultrasonication to achieve very good dispersion. After the acetone evaporated, the mixture appeared homogeneous. The x-ray diffraction of this mixture shows that the interplanar spacing is 30 Å. This is typical intercalated structure. The 14 Å increment of the gallery height is due to the migration of Epon 862 from the extragallery into the intragallery. So the compatibility between SC8 and Epon 862 is very good. Then the resulting mixture of SC8/Epon 862 was mixed with curing agent W. This intercalated morphology will be continued developing into morphology with better dispersion of the nanosilicate in the epoxy resin when it was cured with curing agent W.

The morphology of a 3 wt. % SC8/Epon 862/W nanocomposite was checked with TEM. The TEM image of a 3% wt. of SC8/Epon 862/W nanocomposite is shown in FIG. 1. It can be clearly seen that the clay nanolayer was dispersed well in the whole epoxy matrix. Some of the silicate nanolayers are individual layers, most of them are multilayers (from two to ten), while small amount of silicates are still aggregated, which was made of 20 to 30 nanolayers with the interplanar spacing of 15 to 20 nm. Compared with the original aggregate of clay with micrometer size (hundreds nanolayers aggregation with interplanar spacing of ~1 nm), the dispersion of silicate nanolayer here was very good. The silicate nanolayer is everywhere in the whole polymer matrix. This morphology should give better protection of the polymer system under extreme environment such as atomic oxygen exposure compared to our previous samples with fully-intercalated morphology, which also showed significant improvement of the survivability out in space (MISSE) and oxygen plasma in the lab.

Figure 2:
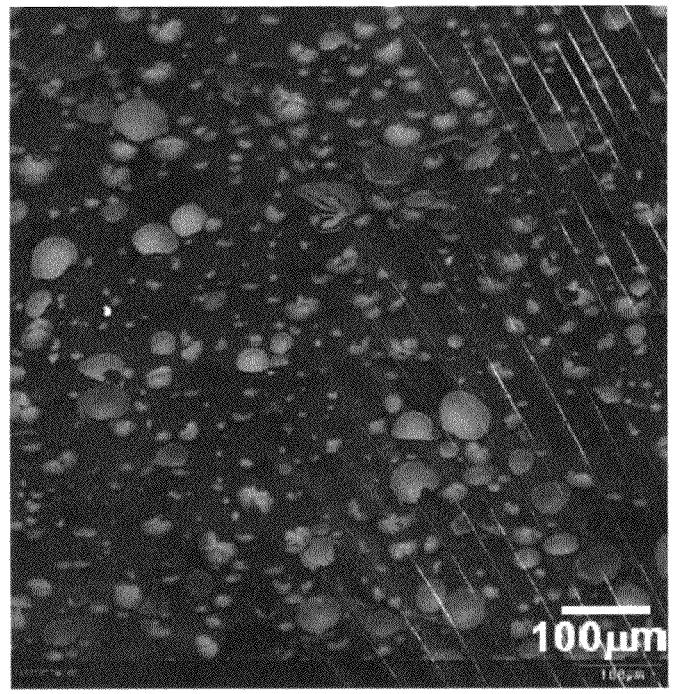
FIG. 2 is a SEM image of 5% SC8/20% Microballoon/Epon862/W hybrid.

The morphology of the microballoon bead in the epoxy resin was checked with SEM. The SEM image of the fracture surface of the 5% SC8/20% Microballoon/Epon862/W hybrid is shown in FIG. 2. The microballoon bead was homogeneously dispersed in the whole epoxy matrix. The microballoon size is in the range of 10 to 100 μm.

Figure 3:
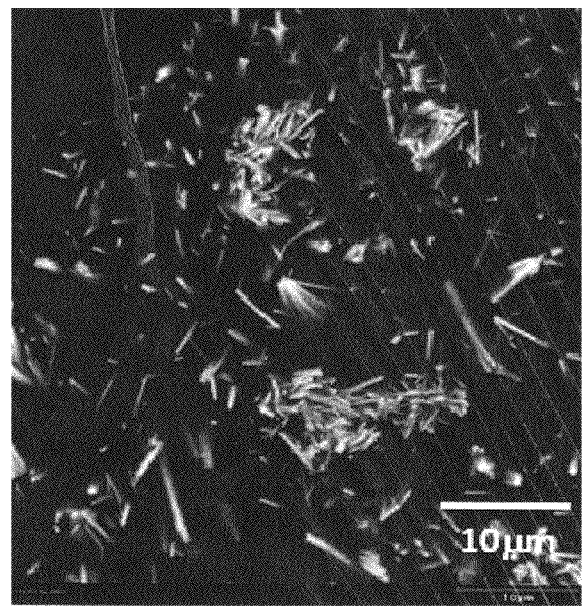
FIG. 3 is SEM images of the 2.5 wt. % SC8/18 wt. % $ZrW_2O_8$/Epon862/W hybrid
Figure 4:
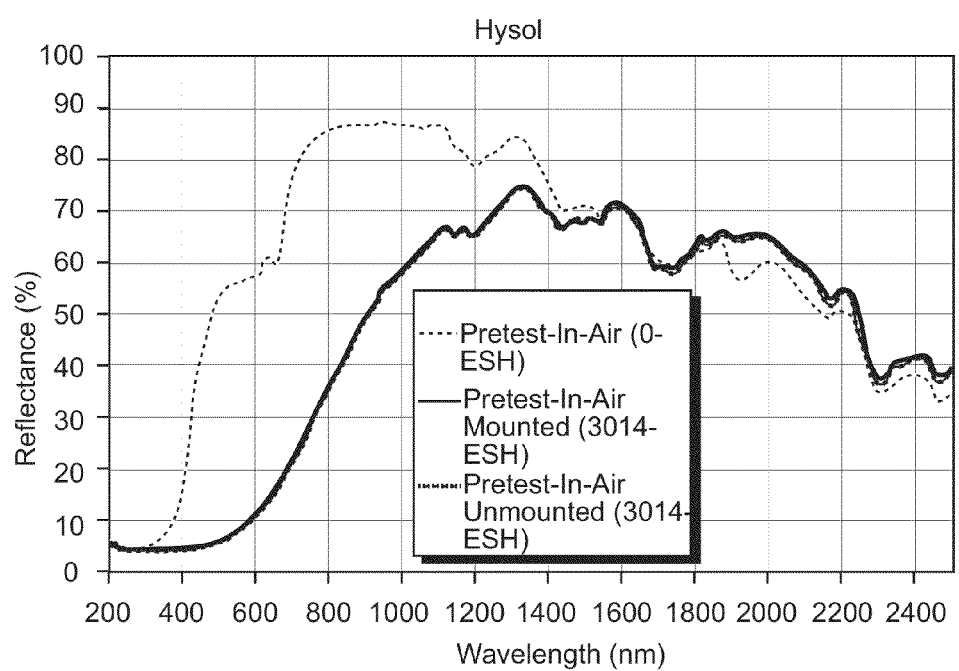
FIG. 4 is an optical reflection performance of the Hysol.
Figure 5:
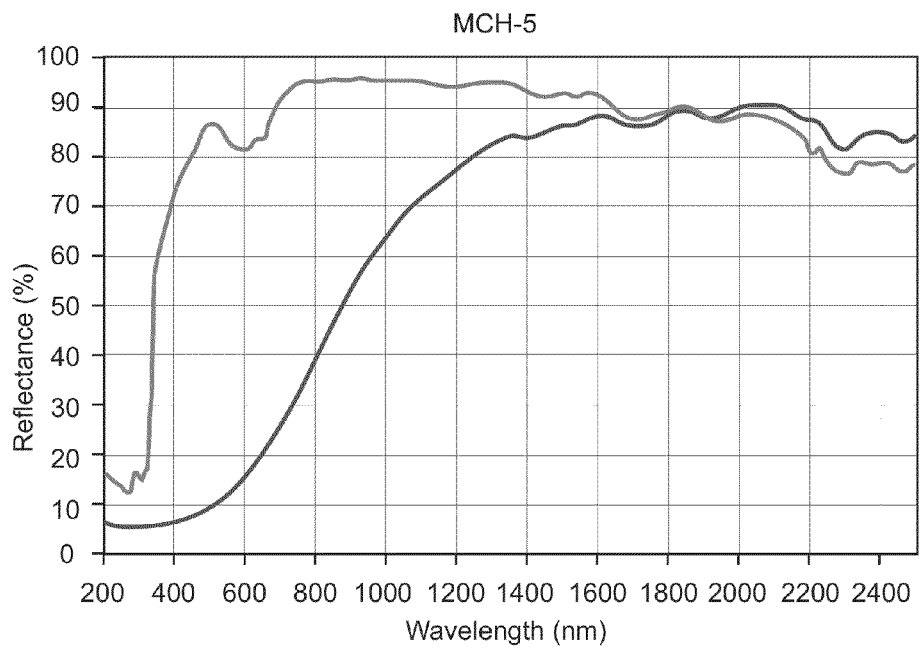
FIG. 5 is an optical reflection performance of the MCH-5.
Figure 6:
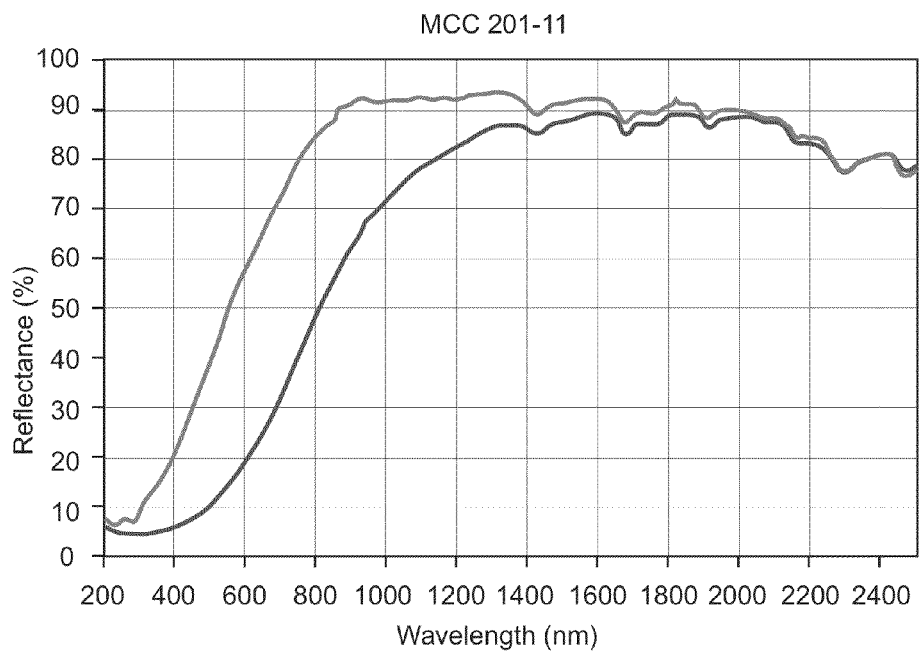
FIG. 6 is an optical reflection performance of the MCC-201-11.
Figure 7:
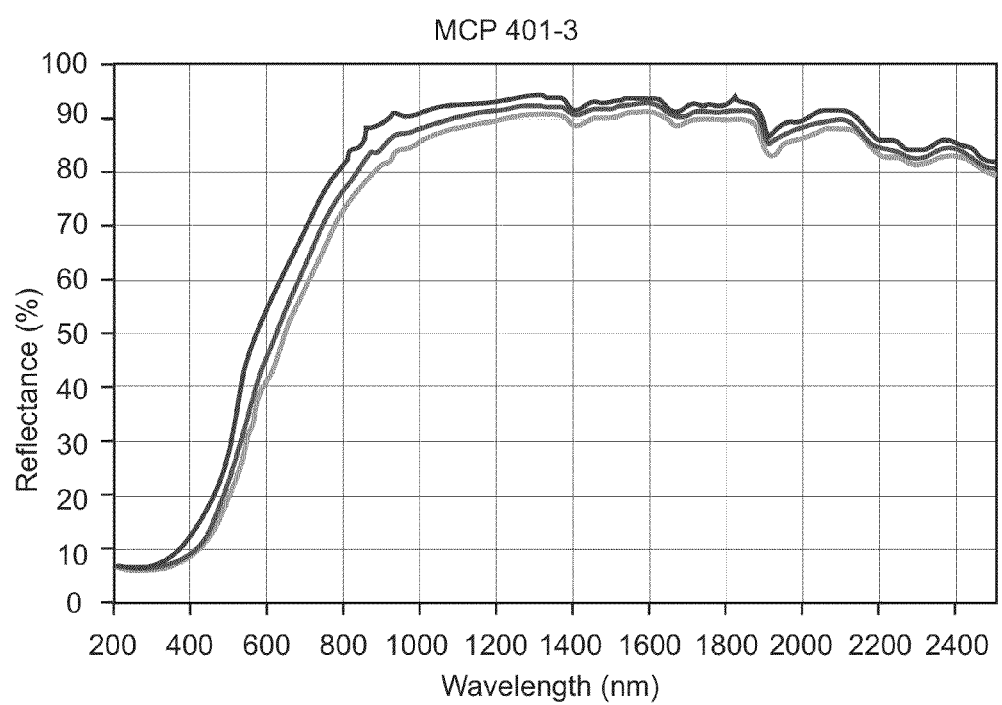
FIG. 7 is an optical reflection performance of the MCP-401-3.

The SEM image of the 2.5 wt. % SC8/18 wt. % $ZrW_2O_8$/Epon862/W hybrid, FIG. 3, shows that the Zirconium Tungstate particles were well dispersed in the epoxy matrix. The silicate nanolays cannot be clearly seen under the magnification in the image since they are nanosized. So the characterization from the TEM and SEM studies showed that the silicate nanolayers were well-dispersed on the nanoscale in the polymer matrix, and microballoon and Zirconium Tungstate particulate were dispersed on the micro-scale in the polymer matrix. All these fillers are well-dispersed in the epoxy resins.

The different ratios of the resin to the glass beads were tried in order to get good adhesion. The 2:1 ratio (resin:bead) appeared too dry; the 3:1 ratio improved, but still was not good enough; while the 4:1 ratio appears good.

In addition, for the repeated high-temperature aircraft structural applications using carbon fiber or metal reinforced polymer composites, the residual stress arising from processing and CTE mismatch between the polymer and carbon fiber or between the polymer and metal could cause crack initiation and de-lamination. So the incorporation of the $ZrW_2O_8$ with a negative coefficient of thermal expansion into the system of the SC8/Epon 862/W resin with and without the glass micro balloons was fabricated. The loadings in the resin are 2.5 wt. % for the nanoclay and 18 wt. % for $ZrW_2O_8$; while the weight ratio of the resin to the glass bead was 4:1, which showed good adhesion to the mirror film. The samples were cased in the mold and then cured at 121° C. (2 hours), and post-cured at 177° C. (2 hours). Up to now, a series of hybrid materials consisting of space durable nanocomposite (SC8/Epon 862/W), $ZrW_2O_8$ (negative CTE), and the glass micro balloons with and without mirror film are successfully prepared.

TABLE I

Coefficients of the thermal Expansion of the Hybrid Materials

| Composition (wt. %) | −100 to 100° C. (glass state) | | 150 to 200° C. (rubber state) | |
|---|---|---|---|---|
| | CTE (ppm/° C.) | Reduction of CTE | CTE (ppm/° C.) | Reduction of CTE |
| SOTA aerospace epoxy (Hysol) | 70.7 (glass state) | | | |
| Pure Epoxy (Epon 862/W) | 56.0 | 0% | 177.3 | 0% |
| 3% SC8/Epoxy | 55.7 | 0.5% | 177.0 | 0.2% |
| 2.5% SC8/18% $ZrW_2O_8$/Epoxy | 48.8 | 12.8% | 143.3 | 19.2% |
| 2% SC8/14.5% $ZrW_2O_8$/20% Microballoon/Epoxy | 27.7 | 50.5% | 57.3 | 67.7% |
| 6% SC8/Epoxy | 50.5 | 9.8% | 143.2 | 19.2% |
| 5% SC8/20% Microballoon/Epoxy | 30.4 | 45.7% | 89.0 | 49.8% |

The coefficients of the thermal expansion of the hybrid materials was checked through thermomechanical analysis (TMA/SDTA 841e, METTLER TOLEDO) with a heating rate of 2° C./min from −100° C. temperature to 200° C. The data of the experimental CTE in the glass state and rubber state are shown in Table II. In the glass state (−100 to 100° C.), the CTE of pure epoxy (Epon 862/W) is 56.0 ppm/° C. The reduction of CTE was very limited with the addition of a 3% wt. of SC8 (organic layered-silicate), while the reduction of CTE was ~10% with the addition of a 6% wt. of SC8. So the layered-silicate can not only enhance the survivability of the polymeric materials in aerospace environment, but also can reduce the CTE of the polymeric materials to some extent.

With the addition of Zirconium Tungstate, the CTE can be further reduced. The CTE of the 2.5 wt. % SC8/18 wt. % $ZrW_2O_8$/Epoxy is 48.8 ppm/° C. The addition of the low-density microballoon can not only further reduce the CTE of the material, but also reduce the density of the hybrid. The CTE of that of 2 wt. % SC8/14.5 wt. % $ZrW_2O_8$/20 wt. % Microballoons/Epoxy hybrid material can be as low as 27.7 ppm/° C. This is more than a 50% reduction of the coefficient of the thermal expansion of the pure epoxy material, which is very impressive. This low CTE is even more impressive compared with the CTE (70.7 ppm/° C.) of SOTA aerospace resin epoxy (Hysol) in the glass state. Similarly, the incorporation of the microballoon into a 6 wt. % SC8/epoxy materials made the CTE of the 5 wt. % SC8/20 wt. % Microballoon/Epoxy hybrid to be reduced to 30.4 ppm/° C., which is 45% reduction of CTE compared with the pure epoxy resin. In addition, this hybrid material (5 wt. % SC8/20 wt. % Microballoon/Epoxy hybrid) was tested with micro VCM test per ASTM E-595-93 at NASA/GSFC. The outgassing result showed that the 5 wt. % SC8/20 wt. % Microballoon/Epoxy hybrid sample performed very well. This hybrid had less than 0.5% net mass loss (average TML value: 0.41%) and no CVCM emissions recorded.

Simultaneously, the reduction of the CTE in the rubber state (150 to 200° C.) is more impressive. The CTE of pure epoxy is 177.3 ppm/° C. in rubber state, while that of 2 wt. % SC8/14.5 wt. % ZrW2O8/20 wt. % Microballoons/Epoxy hybrid material can be as low as 57.3 ppm/° C. This is more than ⅔ reduction of the coefficient of the thermal expansion of the pure materials.

The density of the hybrid after the addition of the fillers was changed. The density of SOTA aerospace resin epoxy (Hysol) is 1.1 g/cm$^3$. The density of pure Epon 862/W resin is 1.2 g/cm$^3$, while that of a 2 wt. % SC8/14.5 wt. % ZrW$_2$O$_8$/20 wt. % Microballoon/Epoxy hybrid is 0.6 g/cm$^3$. So the density of the hybrid can be significantly reduced.

The space simulated environmental test was carried out. The experimental condition is as follows: solar environment: UV: 2.75 EUVS (200-400-nm) (3014-ESH); VUV: ~20 EUVS (115-400-nm) (2800-ESH). Electron flux: 1-keV electrons: $3\times10^9$ e$^-$/cm$^2$/sec; 10-keV electrons: $~6\times10^9$ e$^-$/cm$^2$/sec; Electron fluence after 1096-hrs.: $-3.2\times10^{16}$ e$^-$/cm$^2$; specimen temperature range during exposure: 75-160° C.; vacuum pressure: ~$2.3\times10^{-7}$ torr. The optical reflection performance for different samples was recorded, as shown in the FIGS. 4-7. The optical reflection performance of the Hysol (state of the art (SOTA)) including pretest-in-air, posttest-in-air (3014-ESH) (mounted) and posttest-in-air (3014-ESH) (unmounted) showed that there were some loss of the optical reflection after the 3014-ESH (solar environment UV: 2.75 EUVS (200-400-nm)) simulated space exposure test. There is almost no improvement of the MCH-5 sample while there is some improvement for MCC 201-11 sample. But MCP 401-3 showed exceedingly well optical reflection performance after 3014 ESH simulated space exposure, much better than SOTA aerospace resin (Hysol).

Having thus described exemplary embodiments of the present invention, it should be noted by those skilled in the art that the disclosures herein are exemplary only and that alternatives, adaptations, and modifications may be made within the scope of the present invention.

What is claimed is:

1. A hybrid material with low density and a low coefficient of thermal expansion, comprising a mixture of:
   a) a polymer;
   b) a negative coefficient of thermal expansion powder;
   c) a low density filler; and,
   d) a layered-silicate.

2. The hybrid material of claim 1, wherein said polymer is selected from the group consisting of epoxy, cyanoester, bismalmeide, polyimide, vinylester, polyamide, polyacetal, polycarbonate, polyethylene terephthalate, polysulfone, polyacrylate, and mixtures thereof.

3. The hybrid material of claim 1, wherein said negative coefficient of thermal expansion powder is selected from the group consisting of Zirconium Tungstate, quartz, zeolite and mixtures thereof.

4. The hybrid material of claim 1, wherein said negative coefficient of thermal expansion powder is Zirconium Tungstate, with about 1-60 weight percent of said Zirconium Tungstate powder to said hybrid material.

5. The hybrid material of claim 1, wherein said low density filler is a microballoons filler with about 1-50 weight percent of said microballoon filler to said hybrid material.

6. The hybrid material of claim 1, wherein said layered silicate is a multi-sheet layered silicate selected from the group consisting of montmorillonite, magadite, kenyaite, hectorite, and mixtures thereof.

7. The hybrid material of claim 6, wherein said multi-sheet layered silicate is a montmorillonite with about 0.1-20 weight percent of said montmorillonite to said hybrid material.

8. The hybrid material of claim 1, wherein said layered silicate is a single-sheet layered silicate selected from the group consisting of apophyllite, silinaite, kanemite, and mixtures thereof.

9. The hybrid materials of claim 1, wherein said hybrid material can be used as an adhesive.

10. The hybrid material of claim 1, wherein said hybrid material can be used as an adhesive and substrate of a mirror film.

11. The hybrid material of claim 1, wherein said hybrid material can be used as a matrix for advanced composite materials.

12. The hybrid material of claim 1, wherein said hybrid material can be used as a composite material in dental applications.

13. The hybrid material of claim 1, wherein said hybrid material can be used as a structural substrate for fabricating lightweight mirror assemblages.

14. A method for making the hybrid material of claim 1, said method comprising the steps of:
   a) mixing the polymer with a nano layered silicate to make a nanocomposite mixture;
   b) mixing the nanocomposite mixture with a low density filler and a negative coefficient of thermal expansion powder to form the hybrid material.

15. The method of claim 14, wherein said low density filler is a microballoons filler with about 1-50 weight percent of said microballoon filler to said hybrid material.

16. The method of claim 14, wherein said negative coefficient of thermal expansion powder is Zirconium Tungstate, with about 1-60 weight percent of said Zirconium Tungstate powder to said hybrid material.

* * * * *